United States Patent [19]

Wysong

[11] 4,145,698
[45] Mar. 20, 1979

[54] THERMAL PRINTHEAD BIASING ARRANGEMENT

[75] Inventor: Robert D. Wysong, Boca Raton, Fla.

[73] Assignee: Shakespeare Marine Electronics, Inc., Miami, Fla.

[21] Appl. No.: 858,117

[22] Filed: Dec. 7, 1977

[51] Int. Cl.$^2$ .......................... G01D 15/16; B41J 3/20
[52] U.S. Cl. ................................ 346/139 R; 400/120
[58] Field of Search ...................... 346/139 R, 139 C; 400/120, 124, 166–169

[56] References Cited

U.S. PATENT DOCUMENTS

| | | | |
|---|---|---|---|
| 3,877,035 | 4/1975 | Miller et al. | 346/49 |
| 3,980,169 | 9/1976 | Decker et al. | 400/166 |

*Primary Examiner*—George H. Miller, Jr.
*Attorney, Agent, or Firm*—Hamilton, Renner & Kenner

[57] ABSTRACT

A device for biasing at least one thermal printhead into uniform, tangential contact with the printing media includes a shaft supported by a housing, an assembly rotatable about the shaft for supporting at least one thermal printhead, and at least one biasing spring for establishing and maintaining adequate torsion on the supporting assembly so as to substantially minimize or eliminate positional instability of the printhead. In the event a plurality of thermal printheads are utilized, the biasing spring also simultaneously compresses each of the supporting assemblies so as to substantially minimize the gap between each of the printheads while maintaining the gap dimensions substantially constant.

12 Claims, 5 Drawing Figures

THERMAL PRINTHEAD BIASING ARRANGEMENT

BACKGROUND OF THE INVENTION

The present invention relates generally to a device for mounting stationary printheads. More specifically, the present invention relates to a biasing arrangement for maintaining a plurality of thermal printheads in uniform, tangential contact with the print paper roller platen and in biased engagement with each other while simultaneously, continuously permitting the rotational freedom about both the vertical and longitudinal axis of the thermal printheads biasing mechanism necessary for proper thermographic printing.

Thermal printheads are popular electrically operated stationary printing mechanisms for graphic printing applications requiring high printing speed, simplified mechanical construction, compatability with electrical and/or electronic circuitry, and clarity and unlimited format flexibility in data presentation. Thermal printheads operate by selectively passing current pulses through a plurality of resistor "dots" embedded within the printhead. The heat generated by such pulses passing through the resistors cause a heat sensitive coating on thermographic paper to respond by leaving contrasting colors exposed in the desired configurations.

In order to achieve clear and detailed paper printouts, the portion of the printhead in which the resistor "dots" are embedded must be held in uniform, substantially tangential contact with the thermographic paper. Moreover, since any non-parallelism between the printhead and the printing platen surface will result in non-uniform pressure across the paper and degradation in printing quality, the printhead mounting mechanism should preferably permit rotational freedom around both the longitudinal and transverse axis of the printhead.

Prior art thermal printhead mounting mechanisms have pivotally secured the printhead about a printhead support shaft parallel to that of the printing platen. Such mechanisms achieve the desired degrees of rotational freedom by permitting the printhead to merely rest upon the printing platen and designing the connection with the printhead support shaft to approximate a "pivot point" as closely as possible. Specifically, these mechanisms have employed a strip of suitable material (much narrower in width than that of the printhead) screwed into the printhead itself and loosely coiled about the support shaft in order to effectuate such a "pivot point."

These prior art mounting mechanisms suffer from several substantial deficencies. First, as a result of "pivot point" securement, the printheads exhibit extreme positional instability, especially when the printheads are employed in vibration-prone environments. This positional instability in turn prevents the printhead from maintaining a constant, preferably perpendicular angular registration with respect to the direction of travel of the paper. Additionally, and perhaps most importantly, in applications which require a plurality of thermal printheads in order to present the entire desired patterns, a gap of varying dimensions develops at the junction between each of the printheads resulting in inaccurate display patterns having gross discontinuities therein.

SUMMARY OF THE INVENTION

It is, therefore, an object of the present invention to provide a device for biasing at least one thermal printhead into uniform, substantially tangential contact with the printing media.

It is another object of the present invention to provide a device, as above, in which sufficient rotational freedom is provided both transversely and longitudinally with respect to the thermal printhead while positional instability is simultaneously substantially minimized or eliminated.

It is still another object of the present invention to provide a device for biasing a plurality of thermal printheads into uniform, substantially tangential contact with the printing media in which the gap at the junction between each of the printheads is substantially minimized and of such fixed dimensions suitable for providing accurate display patterns without substantial discontinuities therein.

It is a further object of the present invention to provide a device, as above, in which biasing means are furnished for establishing and maintaining adequate torsion on an assembly supporting each printhead so as to substantially minimize or eliminate positional instability.

It is still a further object of the present invention to provide a device, as above, in which the aforesaid biasing means also compresses each printhead support assembly so as to substantially minimize the gap between each of the printheads while simultaneousely maintaining the gap dimensions substantially constant.

These and other objects, together with the advantages thereof over existing prior art forms, while become more apparent and fully understood from the following description in conjunction with the accompanying drawings.

In general, a device embodying the concept of the present invention includes a shaft supported by a housing, means rotatable about the shaft for supporting at least one stationary printhead and biasing means for establishing and maintaining adequate torsion on the supporting means so as to substantially minimize or eliminate positional instability of the printhead. In the event a plurality of stationary printheads are utilized, the biasing means also simultaneously compresses each of the supporting means so as to substantially minimize the gap between each of the printheads while maintaining the gap dimensions substantially constant.

DESCRIPTION OF A PREFERRED EMBODIMENT

Figure 1:
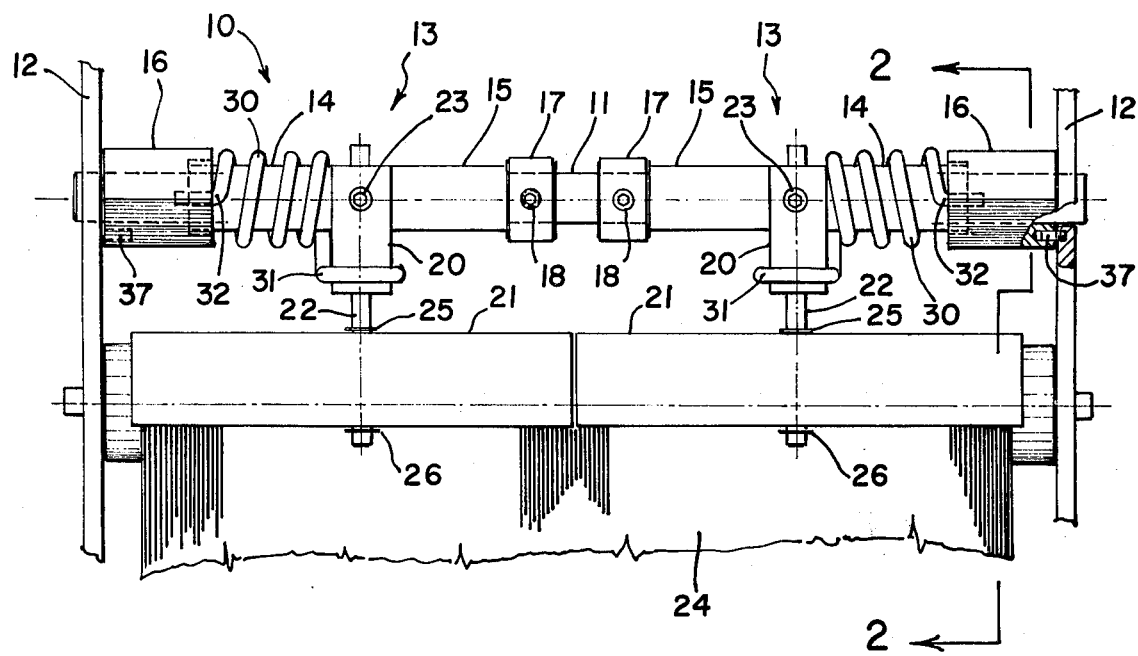
FIG. 1 is a plan view of a biasing arrangement for thermal printheads embodying the concept of the present invention and depicting particularly an arrangement for two thermal printheads.
Figure 2:
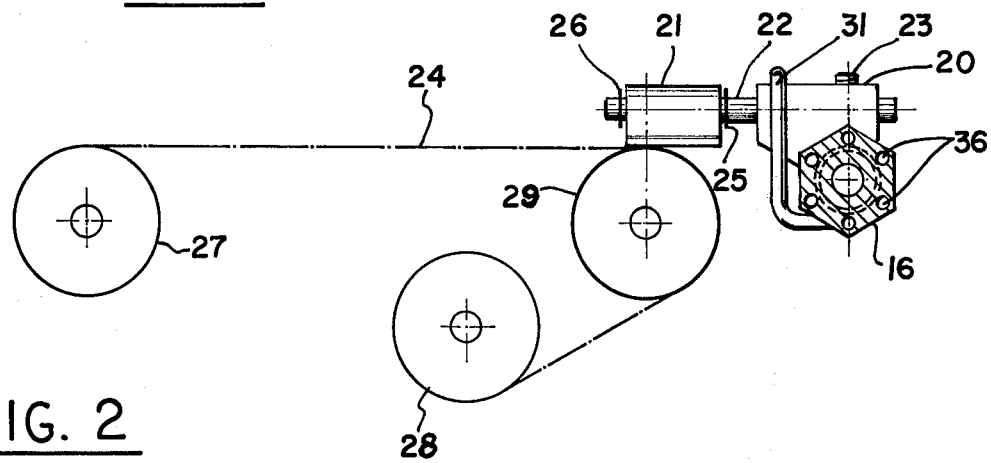
FIG. 2 is a section taken substantially along line 2—2 of FIG. 1 and also illustrating the paper feed, printing platen and take-up rollers.

Referring now to FIGS. 1 and 2, a biasing arrangement for thermal printheads embodying the concept of the present invention is illustrated generally by the numeral 10. The biasing arrangement 10 has a support shaft 11 both ends of which may be pivotably or otherwise supported by any suitable housing 12. A printhead support assembly for each printhead is indicated generally by the numeral 13 and is rotatable about and perpendicular to shaft 11. Each printhead support assembly is positioned between two spacer sleeves 14, 15 that are themselves coaxial with and longitudinally slidable along shaft 11, such sleeves serving to position each printhead laterally along the longitudinal axis of shaft 11. Spacer Sleeves 14, 15 are in turn, respectively, laterally secured by spring adjuster nut 16, whose operation is detailed hereinbelow, and spacer stop 17 having set screw 18 for adjustably fixing the longitudinal position of spacer stop 17 along shaft 11.

It should be noted that although spacer sleeves 14, 15 are preferably rotatable about shaft 11 in order to more readily permit lateral adjustment of printhead support asssembly 13, such rotation is not mandatory. However, in the event the spacer sleeves 14, 15 are rotatable, they may be integrally formed with printhead support assembly 13.

Printhead support assembly 13 includes block 20 rotatable about shaft 11, printhead 21, and printhead support shaft 22 passing through both block 20 and printhead 21. Although any fixed printhead may be suitable for use with the present invention, with the thermal printhead envisioned in the present preferred emobdiment, it is desirable that support shaft 22 be rotatable within the interference fit provided it in at least block 20. A set screw 23 may be provided in block 20 to secure printhead support shaft 22 while permitting both rotational adjustment and transverse alignment of printhead support shaft 22, thus facilitating the uniform, tangential contact of printhead 21 with the printing paper 24. Although the exact manner by which printing paper 24 is fed is not germane to the present invention, one acceptable feed mechanism could include feed roller 28 from which printing paper 24 would originate, printing platen 29 and take-up roller 27. In the event complete rotational freedom of printhead 21 about its support shaft 22 is found desirable, retaining rings 25, 26 may be provided about support shaft 22 on both sides of printhead 21.

A helical compression spring 30 is provided for each printhead 21 coaxial with and rotatable about spacer sleeve 14 for compressing each printhead 21 inwardly towards the other printhead and for simultaneously maintaining the printhead support assembly 13 in torsion about shaft 11. Accordingly, the end of spring 30 closest to printhead support assembly 13 is extended beneath and beyond shaft 11, bent ninty degrees to ascend block 20, and formed in the shape of a hook 31 across the top surface of block 20. The end of spring 30 closest to housing 12 is also bent to form a finger 32 parallel to the longitudinal axis of shaft 11 for insertion into an orifice 33 within adjuster nut 16.

Figures 3, 4, 5:
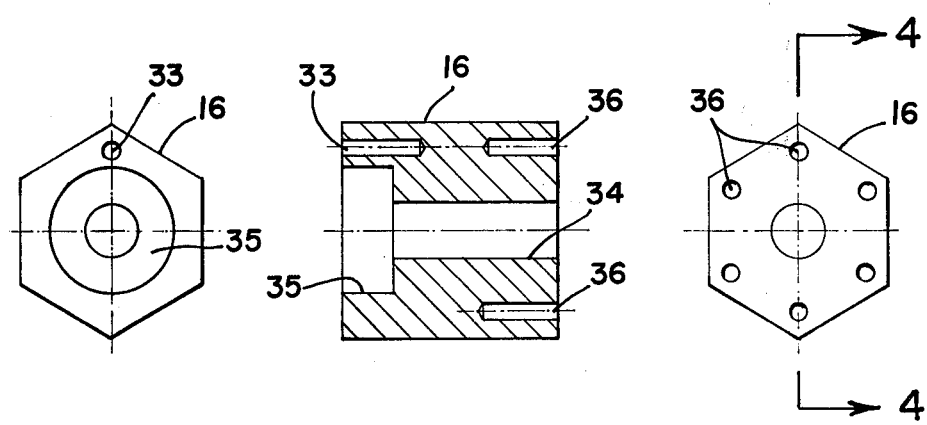
FIG. 3 is an end view of an adjuster nut according to the concept of the present invention.
FIG. 4 is a section taken substantially along line 4—4 of the adjuster nut depicted in FIG. 3.
FIG. 5 is an end view of the adjuster nut depicting the end opposite that shown in FIG. 3.

Turning primarily to FIGS. 3, 4 and 5, adjuster nut 16 additionally can be seen to have a passageway 34 through which shaft 11 may pass, a recessed notch 35 within which spacer sleeve 14 may fit, and a plurality of orifices 36 on the side of adjuster nut 16 closest to housing 12. A tang 37 is fixed to housing 12 and may be inserted into whichever orifice 36 desired, thereby securing adjuster nut 16 to housing 12. It should now be evident that rotation of adjuster nut 16 and insertion of tang 37 into the various orifices 36 will result in adjustment of primarily torsion and secondarily compressive forces provided by spring 30, which spring is affixed to adjuster nut 16 by the insertion of finger 32 into orifice 33. It is to be emphasized that any device for adjusting the torsion and/or compression of a helical spring should be suitable for use in place of adjuster nut 16.

A device according to the concept of the present invention and in particular for biasing two printheads has been described hereinabove. However, the present invention is equally applicable to displays utilizing any number of printheads. For example, where only a single printhead was necessary, the second spacer sleeve 15 and sleeve stop 17 could be eliminated and a helical compression spring positioned adjacent both sides of block 20. Of course, in biasing only one printhead only torsion forces would be of concern as no "gap" would exist. Similarly, for biasing more than two printheads, sleeve stops 17 could be eliminated and spacer sleeves 15 could be extended to block 20 associated with the next adjacent printhead. Additional helical compression springs would then be extended between each interior printhead support assembly.

Inasmuch as the present invention is subject to many variations, modifications and changes in detail, a number of which have been expressly stated herein, it is intended that all matter described throughout this entire specification or shown in the accompanying drawings be interpreted as illustrative and not in a limiting sense. It should thus be evident that a device constructed according to the concept of the present invention, and reasonably equivalent thereto, will accomplish the objects of the present invention and otherwise substantially improve the printhead biasing art.

I claim:

1. A device for biasing at least one stationary printhead into uniform, tangential contact with the printing media comprising:
   a housing;
   a shaft supported by said housing;
   means rotatable about said shaft for support of said printhead; and
   biasing means for maintaining adequate torsion on said means for support thereby establishing and maintaining uniform, tangential contact with the printing media.

2. A device, as in claim 1, wherein said biasing means is coaxial with and rotatable about said shaft.

3. A device, as in claim 2, further including means coaxial with and rotatable about said shaft and securable with said housing for adjusting said biasing means.

4. A device, as in claim 3, wherein said biasing means includes means for securing said biasing means to said housing and means for maintaining said means for support in torsion about said shaft.

5. A device, as in claim 4, wherein said biasing means is a helical spring, said means for securing is a tang formed with one end of said spring, and said means for maintaining said means for support in torsion about said shaft is a hook formed with the opposite end of said spring and positioned around at least a portion of said means for support.

6. A device, as in claim 4, further including means coaxial with said shaft for spacing said means for support laterally about said shaft, at least some portion of said spacing means being interposed between said shaft and said biasing means, and stop means for adjustably fixing the positioning of said spacing means and said support means laterally about said shaft.

7. A device for biasing a plurality of stationary printheads into uniform, tangential contact with the printing media comprising:
- a housing;
- a shaft supported by said housing;
- means rotatable about said shaft for support of each of the plurality of printheads; and
- biasing means for maintaining adequate torsion on said means for support thereby establishing and maintaining uniform, tangential contact with the printing media and for simultaneously compressing each said means for support inwardly towards the center of said shaft so as to minimize the space between each of the printheads.

8. A device, as in claim 7, wherein said biasing means is coaxial with and rotatable about said shaft.

9. A device, as in claim 8, further including means coaxial with and rotatable about said shaft and securable with said housing for adjusting said biasing means.

10. A device, as in claim 9, wherein said biasing means includes means for securing said biasing means to said housing and means for maintaining said means for support in torsion about said shaft.

11. A device, as in claim 10, wherein said biasing means is a helical spring, said means for securing is a tang formed with one end of said spring, and said means for maintaining said means for support in torsion about said shaft is a hook formed with the opposite end of said spring and positioned around at least a portion of said means for support.

12. A device, as in claim 10, further including means coaxial with said shaft spacing said means for supoort laterally about said shaft, at least some portion of said spacing means being interposed between said shaft and said biasing means, and stop means for adjustably fixing the positioning of said spacing means and said support means laterally about said shaft.

* * * * *